B. Sanderson,
Wood Auger.

Nº 38,633.  Patented May 19, 1863.

Witnesses:
Benj. H. Steele
Geo. D. Wyman

Inventor:
Burton Sanderson

UNITED STATES PATENT OFFICE.

BURTON SANDERSON, OF DERBY LINE, VERMONT, ASSIGNOR TO E. C. MERRILL & CO.

IMPROVED BIT OR BORING-TOOL.

Specification forming part of Letters Patent No. 38,633, dated May 19, 1863.

*To all whom it may concern:*

Be it known that I, BURTON SANDERSON, of Derby Line, in the county of Orleans and State of Vermont, have invented an Improved Bit or Boring-Tool, which is particularly useful in tapping trees; and I do hereby declare the same to be fully described in the following specification and represented in the accompanying drawings, of which—

Figure 1:
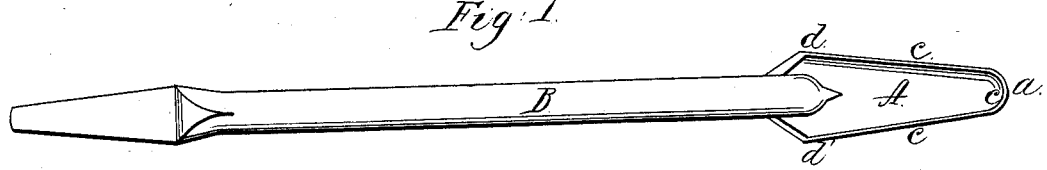
Figure 2:
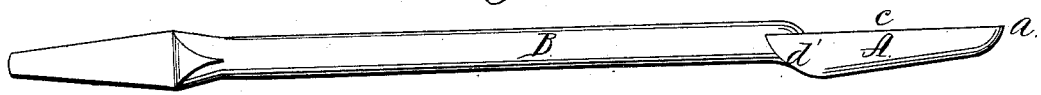
Figure 3:

Figure 1 is a top view, Fig. 2 a side elevation, and Fig. 3 a longitudinal section, of my said invention.

It is a fact well known that hundreds, if not thousands, of valuable trees are destroyed annually by what is technically termed "tapping" them. This destruction arises not so much from the mere fact of such trees having been bored into as from the barbarous mangling of the heart of the tree by the instrument employed in boring the hole or passage for the issue of the sap or saccharine matter. It is also well known that the implement employed for this purpose is the common auger. Now, with such auger it is impossible to bore a smooth hole on its inner end, as the worm of the auger extends directly into the inner part or heart of the tree one-fourth of an inch or more beyond what it is desired to have the hole made. This, of course, is a detriment to the vitality of any tree, but especially of a young one, as such injured or bruised part is not so liable to heal up as if the incision had been of a proper depth, and the parts had been left in a smooth state. The object of my invention is to provide a tool which shall remedy this evil.

In carrying out my improvement, I construct my improved boring or "tapping" tool with its boring part of a semi-conoidal form—that is, of a semi-conic frustum—having its lesser part or base surmounted by a concavo-convex head or end, and I make its cutting-edge in one continuous line, extending entirely around the boring part of the bit, whereby the inner end of a hole, as well as the surfaces thereof, when made in a tree or other article by my improved boring-tool, is formed perfectly smooth.

In the drawings, A denotes the lower or cutting part of my improved boring-tool, while B is the shank thereof. The said part A is of a hollow semi-conoidal shape, having its smaller base or entering end *a* terminating in half of a hollow hemispheroid. *c c c* represent the cutting-edge, which extends from one extremity, *d*, of the base of the conoid entirely around to the other extremity, *d'*, thereof, as seen in the drawings.

My improved bit or boring-tool is not only adapted to the tapping of trees, but it can be used with equal facility as the common auger or bit in boring a hole in any article, and, besides, it is not so liable to get out of repair or broken as they are.

I do not claim a semi-conical bit or reamer, whether such be of a solid or tubular form, nor do I claim a semi-frusto conical borer, having its smaller base terminating in a conical worm, as I am aware that such is not new; but

I claim—

My improved boring-tool as made, not only in the tapering form described, and with its smaller end of a concavo-convex shape, but with its cutting-edge extending entirely around the part A, in manner as set forth.

BURTON SANDERSON.

Witnesses:
BENJ. H. STEELE,
GEO. D. WYMAN.